(12) United States Patent
Komori (10) Patent No.: US 10,944,099 B2
(45) Date of Patent: Mar. 9, 2021

(54) FLUORIDE ION CONDUCTOR CONTAINING POTASSIUM, ALKALINE EARTH METAL, AND FLUORINE, AND FLUORIDE ION SECONDARY BATTERY INCLUDING THE SAME

(71) Applicant: Panasonic Corporation, Osaka (JP)

(72) Inventor: Tomoyuki Komori, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 128 days.

(21) Appl. No.: 16/216,173

(22) Filed: Dec. 11, 2018

(65) Prior Publication Data
US 2019/0207207 A1   Jul. 4, 2019

(30) Foreign Application Priority Data

Dec. 28, 2017 (JP) .............................. JP2017-254476

(51) Int. Cl.
*H01M 4/136* (2010.01)
*C01F 11/00* (2006.01)
(Continued)

(52) U.S. Cl.
CPC .............. *H01M 4/136* (2013.01); *C01D 3/02* (2013.01); *C01F 11/00* (2013.01); *C01F 11/22* (2013.01); *H01M 4/38* (2013.01); *H01M 4/388* (2013.01); *H01M 10/05* (2013.01); *H01M 10/054* (2013.01); *H01M 10/0562* (2013.01); *H01M 10/0563* (2013.01); *H01M 10/0568* (2013.01); *H01M 10/4235* (2013.01); *C01P 2006/40* (2013.01); *H01M 2004/027* (2013.01);
(Continued)

(58) Field of Classification Search
CPC .. H01M 10/054; H01M 10/0563; H01M 4/58; H01M 10/05; H01M 4/582; H01M 10/0562; H01M 2300/002; H01M 4/0407; H01M 2300/008; H01B 1/00; H01B 1/122; C01F 5/00; C01F 5/28
See application file for complete search history.

(56) References Cited

U.S. PATENT DOCUMENTS 7,468,120 B2 * 12/2008 Jacobson .............. H01M 8/124
                                                   204/252
2002/0102497 A1   8/2002 Sparrow
(Continued)

FOREIGN PATENT DOCUMENTS

CN       1367878 A    9/2002
EP       1873850 A1   1/2008
(Continued)

OTHER PUBLICATIONS

Extended European Search Report issued in corresponding European Patent Application No. 18210640.1, dated May 23, 2019.
(Continued)

*Primary Examiner* — Alexander Usyatinsky
(74) *Attorney, Agent, or Firm* — McDermott Will & Emery LLP (57) ABSTRACT

A fluoride ion conductor contains potassium, at least one alkaline earth metal selected from the group consisting of calcium, barium, and strontium, and fluorine. The fluoride ion conductor includes a phase of a compound containing potassium, at least one alkaline earth metal, and fluorine.

13 Claims, 1 Drawing Sheet

(51) Int. Cl.
*C01D 3/02* (2006.01)
*H01M 4/38* (2006.01)
*H01M 10/05* (2010.01)
*H01M 10/0562* (2010.01)
*H01M 10/42* (2006.01)
*C01F 11/22* (2006.01)
*H01M 10/0568* (2010.01)
*H01M 10/054* (2010.01)
*H01M 10/0563* (2010.01)
*H01M 4/02* (2006.01)

(52) U.S. Cl.
CPC ............... *H01M 2004/028* (2013.01); *H01M 2300/002* (2013.01); *H01M 2300/008* (2013.01); *H01M 2300/0017* (2013.01)

(56) References Cited

U.S. PATENT DOCUMENTS

| | | | |
|---|---|---|---|
| 2008/0034579 | A1 | 2/2008 | Potanin |
| 2008/0102373 | A1 | 5/2008 | Potanin |
| 2010/0129713 | A1* | 5/2010 | Yazami ................ H01M 4/582 429/217 |
| 2012/0164541 | A1* | 6/2012 | Darolles ............... H01M 6/164 429/326 |
| 2013/0048924 | A1 | 2/2013 | Amatucci et al. |
| 2014/0030559 | A1* | 1/2014 | Yazami ................ H01M 4/382 429/50 |
| 2016/0043440 | A1* | 2/2016 | Nakamoto ........ H01M 10/0569 429/341 |
| 2016/0285129 | A1* | 9/2016 | Nakamoto ........... H01M 6/166 |

FOREIGN PATENT DOCUMENTS

| | | | |
|---|---|---|---|
| EP | 1873850 | * | 2/2018 |
| JP | 2008-537312 | | 9/2008 |
| JP | 2008-538649 | | 10/2008 |
| JP | 2013-014578 | | 1/2013 |
| JP | 2013-510409 | | 3/2013 |
| JP | 2017-084506 | | 5/2017 |
| JP | 2018-041672 | | 3/2018 |
| JP | 2018-041673 | | 3/2018 |

OTHER PUBLICATIONS

P.P. Fedorov et al., "The solubility of sodium and potassium fluorides in strontium fluoride", Nanosystems: Physics, Chemistry, Mathematics, Dec. 26, 2017, pp. 830-834.

* cited by examiner

FLUORIDE ION CONDUCTOR CONTAINING POTASSIUM, ALKALINE EARTH METAL, AND FLUORINE, AND FLUORIDE ION SECONDARY BATTERY INCLUDING THE SAME

BACKGROUND

1. Technical Field

The present disclosure relates to a fluoride ion conductor and a fluoride ion secondary battery.

2. Description of the Related Art

As one type of secondary batteries, shuttlecock batteries are known. In the shuttlecock batteries, ions migrate between a positive electrode and a negative electrode via an electrolyte to perform charge and discharge. Lithium ion secondary batteries using lithium ions as the migrating ions have been widely spread as shuttlecock batteries. In recent years, fluoride ion secondary batteries using fluoride ions instead of lithium ions have been reported.

Japanese Unexamined Patent Application Publication (Translation of PCT Application) No. 2008-537312 discloses a solid electrolyte that can be used in fluoride solid-state secondary batteries. This solid electrolyte is a complex fluoride of an alkaline earth metal fluoride (e.g. $CaF_2$, $SrF_2$, or $BaF_2$) as a base and an alloying addition of a rare earth metal fluoride and/or an alkali metal fluoride (e.g. LiF, KF, or NaF) and/or an alkali metal chloride (e.g. LiCl, KCl, or NaCl).

Japanese Unexamined Patent Application Publication (Translation of PCT Application) No. 2013-510409 discloses an electron insulation amorphous ion conductor composition further including a glass network modifier. This glass network modifier is $LaF_3$, $BiF_3$, $PbF_2$, KF, $CaF_2$, $BaF_2$, $SnF_2$, $SrF_2$, or a rare earth metal fluoride.

SUMMARY

In one general aspect, the techniques disclosed here feature a fluoride ion conductor containing potassium, at least one alkaline earth metal selected from the group consisting of calcium, barium, and strontium, and fluorine. The fluoride ion conductor includes a phase of a compound containing potassium, the at least one alkaline earth metal, and fluorine.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

Fluoride ion secondary batteries can have effects as shuttlecock secondary batteries. The effects are, for example, high stability, a high energy density, and a high output density. However, the fluoride ion secondary batteries are still in the process of research and development. If an electrolyte material having a high fluoride ion conductivity can be found, the performance of the fluoride ion secondary batteries can be improved. The present inventors have diligently studied and, as a result, have found a material of the present disclosure showing a high fluoride ion conductivity. According to the present disclosure, for example, a fluoride ion secondary battery having high performance is achieved.

Various Aspects of the Present Disclosure

A fluoride ion conductor according to a first aspect of the present disclosure contains potassium, at least one alkaline earth metal selected from the group consisting of calcium, barium, and strontium, and fluorine. The fluoride ion conductor includes a phase of a compound containing potassium, the at least one alkaline earth metal, and fluorine.

When the phase of the compound is a crystal phase, the composition and structure thereof can be identified by an X-ray diffraction method.

In a second aspect of the present disclosure, the fluoride ion conductor according to the first aspect may further include a phase of a mixture containing potassium, the at least one alkaline earth metal, and fluorine.

The mixture may be a mixture of, for example, potassium, an alkaline earth metal, and fluorine. Alternatively, the mixture may be a mixture of, for example, a fluoride of potassium and a fluoride of an alkaline earth metal. When the phase of the mixture include a plurality of crystal phases, the compositions and structures of such phases can be identified by an X-ray diffraction method.

In a third aspect of the present disclosure, the fluoride ion conductor according to the first or second aspect may be composed of potassium, the at least one alkaline earth metal, and fluorine.

Incidentally, in the present disclosure, the term "consist of X" does not mean that fluoride ion conductors containing impurities inevitably mixed in raw materials or in the manufacturing process are disclaimed. Here, the term "inevitably mixed impurities" means impurities contained in a fluoride ion conductor in an amount of, for example, less than 0.05 mol %.

In a fourth aspect of the present disclosure, the at least one alkaline earth metal according to any one of the first to third aspects may include calcium. In such a case, in the average composition of the fluoride ion conductor, the ratio of the number $M_Z$ of moles of the at least one alkaline earth metal to the total number $M_K+M_Z$ of moles of the potassium and the at least one alkaline earth metal, $M_Z/(M_K+M_Z)$, may be 0.2 or more and 0.3 or less.

When the fluoride ion conductor has a single-phase structure of a compound phase, the term "average composition" refers to the composition of the compound. Alternatively, when the fluoride ion conductor has a multiple-phase structure of a compound phase and a mixture phase, the term "average composition" refers to the composition obtained by conducting elemental analysis without considering distinction of each phase of the fluoride ion conductor. The phrase "without considering distinction of each phase" typically means a composition obtained by conducting elemental analysis using a sample having a size larger than that of raw material powder of the fluoride ion conductor.

The average composition can be identified by combining inductively coupled plasma (ICP) emission spectroscopic analysis and ion chromatography. For example, the metal contained in a fluoride ion conductor is analyzed by ICP emission spectroscopic analysis, and fluorine is analyzed by ion chromatography.

In a fifth aspect of the present disclosure, the at least one alkaline earth metal according to the fourth aspect may be calcium.

In a sixth aspect of the present disclosure, the at least one alkaline earth metal according to any one of the first to third aspects may include strontium. In such a case, in the average composition of the fluoride ion conductor, the ratio of the number $M_Z$ of moles of the at least one alkaline earth metal to the total number $M_K+M_Z$ of moles of the potassium and the at least one alkaline earth metal, $M_Z/(M_K+M_Z)$, may be 0.1 or more and 0.6 or less.

In a seventh aspect of the present disclosure, the at least one alkaline earth metal according to the sixth aspect may be strontium.

In an eighth aspect of the present aspect, the at least one alkaline earth metal according to any one of the first to third aspects may include barium. In such a case, in the average composition of the fluoride ion conductor, the ratio of the number $M_Z$ of moles of the at least one alkaline earth metal to the total number $M_K+M_Z$ of moles of the potassium and the at least one alkaline earth metal, $M_Z/(M_K+M_Z)$, may be 0.1 or more and 0.8 or less.

In a ninth aspect of the present disclosure, the at least one alkaline earth metal according to the eighth aspect may be barium.

A fluoride ion secondary battery according to a tenth aspect of the present disclosure includes a positive electrode, a negative electrode, and an electrolyte disposed between the positive electrode and the negative electrode and having a fluoride ion conductivity. At least one of the positive electrode, the negative electrode, and the electrolyte includes the fluoride ion conductor according to any one of the first to ninth aspects.

In an eleventh aspect of the present disclosure, the negative electrode according to the tenth aspect may include the fluoride ion conductor.

In a twelfth aspect of the present disclosure, the negative electrode according to the eleventh aspect may include a negative electrode active material and a coat coating the negative electrode active material, and the coat may contain the fluoride ion conductor. In such a case, the coat suppresses the reaction between the negative electrode active material and the electrolyte, and therefore, for example, decomposition of the electrolyte can be prevented.

In a thirteenth aspect of the present disclosure, the positive electrode according to any one of the tenth to twelfth aspects may include the fluoride ion conductor.

In a fourteenth aspect of the present disclosure, the positive electrode according to the thirteenth aspect may include a positive electrode active material and a coat coating the positive electrode active material, and the coat may contain the fluoride ion conductor. In such a case, the coat suppresses the reaction between the positive electrode active material and the electrolyte, and therefore, for example, decomposition of the electrolyte can be prevented.

In a fifteenth aspect of the present disclosure, the electrolyte according to any one of the tenth to fourteenth aspects may be a liquid electrolyte. For example, the liquid electrolyte may be a solution in which a fluoride salt is dissolved in a solvent.

In a sixteenth aspect of the present disclosure, the electrolyte according to any one of the tenth to fourteenth aspects may include the fluoride ion conductor.

In a seventeenth aspect of the present disclosure, the positive electrode according to any one of the tenth to sixteenth aspects may include a positive electrode active material containing at least one selected from the group consisting of Co, Cu, Bi, Sn, Pb, Fe, Zn, Ga, and C.

In an eighteenth aspect of the present disclosure, the negative electrode according to any one of the tenth to seventeenth aspects may include a negative electrode active material containing at least one selected from the group consisting of Ti, Zr, Al, Sc, Rb, Ge, Cs, Mg, K, Na, La, Ca, Ba, and Sr.

Embodiments

Embodiments of the present disclosure will now be described with reference to the drawings. The embodiments described below are all inclusive and specific examples. The numerical values, shapes, materials, components, arrangement positions and connection forms of components, process conditions, steps, the order of steps, etc. shown in the following embodiments are merely examples and are not intended to limit the present disclosure. Among the components in the following embodiments, the components not described in the independent claim showing the broadest concept are described as optional components. In addition, each drawing is a schematic view and is not necessarily exactly illustrated.

1. First Embodiment

The fluoride ion conductive material of this embodiment has a composition represented by the formula $K_{1-x}Z_xF_{1+x}$. In the formula, Z is at least one element selected from the group consisting of Ca, Sr, and Ba. When Z includes Ca, x satisfies $0.2 \leq x \leq 0.3$. When Z includes Sr, x satisfies $0.2 \leq x \leq 0.6$. When Z includes Ba, x satisfies $0.1 \leq x \leq 0.8$.

The fluoride ion conductive material may contain potassium fluoride and calcium fluoride. In this case, the molar ratio of potassium (K) and calcium (Ca), K:Ca, contained in the material can be, for example, 80:20 to 70:30. The material can have a composition represented by the formula $K_{1-x}Z_xF_{1+x}$, where Z is Ca, and x satisfies $0.2 \leq x \leq 0.3$. The fluoride ion conductive material having this composition can have a higher fluoride ion conductivity.

The fluoride ion conductive material may contain potassium fluoride and strontium fluoride. In this case, the molar ratio of potassium (K) and strontium (Sr), K:Sr, contained in the material can be, for example, 90:10 to 40:60. The material can have a composition represented by the formula $K_{1-x}Z_xF_{1+x}$, where Z is Sr, and x satisfies $0.1 \leq x \leq 0.6$. The fluoride ion conductive material having this composition can have a higher fluoride ion conductivity.

The fluoride ion conductive material may contain potassium fluoride and barium fluoride. In this case, the molar ratio of potassium (K) and barium (Ba), K:Ba, contained in the material can be, for example, 90:10 to 20:80. The material can have a composition represented by the formula $K_{1-x}Z_xF_{1+x}$, where Z is Ba, and x satisfies $0.1 \leq x \leq 0.8$. The fluoride ion conductive material having this composition can have a higher fluoride ion conductivity.

In the fluoride ion conductive material of the embodiment, fluorine may be partially deficient.

The crystalline state of the fluoride ion conductive material of the embodiment is not limited and can be single crystal, polycrystal, amorphous, or a mixture thereof.

The fluoride ion conductive material of the embodiment may have any shape. The material can have an arbitrary shape, such as particles, a film, a sheet, a disk, a bulk, or a green compact. The material can have, for example, a shape capable of being accommodated in a housing of a fluoride ion secondary battery described below. The material can have a shape capable of being laminated with the positive electrode layer and the negative electrode layer of a fluoride ion secondary battery described below. The ion conductive material of the embodiment can be a solid fluoride ion conductive material.

The fluoride ion conductive material of the embodiment can have a fluoride ion conductivity of, for example, $1.0 \times 10^{-6}$ S/cm or more, $5.0 \times 10^{-6}$ S/cm or more, $1.0 \times 10^{-5}$ S/cm or more, $2.0 \times 10^{-5}$ S/cm or more, $1.0 \times 10^{-4}$ S/cm or more, $1.0 \times 10^{-3}$ S/cm or more, or $1.0 \times 10^{-2}$ S/cm or more. The fluoride ion conductivity can be evaluated by, for example, a complex impedance method by pressing particles of the material into a disk and connecting both main surfaces of the disk maintained at a desired temperature to an impedance analyzer. The fluoride ion conductive material of the embodiment can exhibit a high fluoride ion conductivity at relatively low temperature of 200° C. or less, or 150° C. or less.

The use of the fluoride ion conductive material of the embodiment is not limited. The material can be used, for example, as a solid fluoride ion conductive material. More specifically, the material can be used as a solid electrolyte conducting fluoride ions. The ion conductive material of the embodiment can be used in, for example, a fluoride ion secondary battery. The fluoride ion secondary battery is a rechargeable secondary battery. The fluoride ion secondary battery is charged and discharged by migration of fluoride ions between the positive electrode and the negative electrode via an electrolyte. The fluoride ion conductive material of the embodiment can be used as an electrolyte included in at least one layer selected from the positive electrode layer, the negative electrode layer, and the electrolyte layer of the battery. More specifically, the fluoride ion conductive material of the embodiment can be used as an electrolyte included in the electrolyte layer, in particular, a solid electrolyte layer, of the battery. The fluoride ion conductive material of the embodiment can also be used as the negative electrode active material included in the negative electrode layer of a fluoride ion secondary battery depending on the combination with the positive electrode active material included in the positive electrode layer.

A fluoride ion secondary battery including the fluoride ion conductive material of the embodiment can be an all-solid secondary battery. The all-solid secondary battery is highly safe and can have a high energy density depending on the structure of the positive electrode layer, the electrolyte layer, and the negative electrode layer.

The use of the fluoride ion conductive material of the embodiment as the electrolyte and/or the negative electrode active material of the fluoride ion secondary battery can construct a fluoride ion secondary battery that can be operated at, for example, 200° C. or less or 150° C. or less.

The fluoride ion conductive material of the embodiment may be produced by any method. For example, the material can be produced by mixing potassium fluoride and at least one selected from the group consisting of calcium fluoride, strontium fluoride, and barium fluoride so as to give a desired molar concentration ratio of K and at least one selected from the group consisting of Ca, Sr, and Ba after the mixing. When the mixing is performed using a pulverizer, such as a ball mill or a rod mill, or a particle mixing device, the ion conductive material has a more uniform composition. The potassium fluoride is, for example, KF. The calcium fluoride is, for example, $CaF_2$. The strontium fluoride is, for example, $SrF_2$. The barium fluoride is, for example, $BaF_2$. The ion conductive material after mixing can be molded into a prescribed shape. In the molding, for example, pressing and sintering can be employed.

2. Second Embodiment

Figure 1:
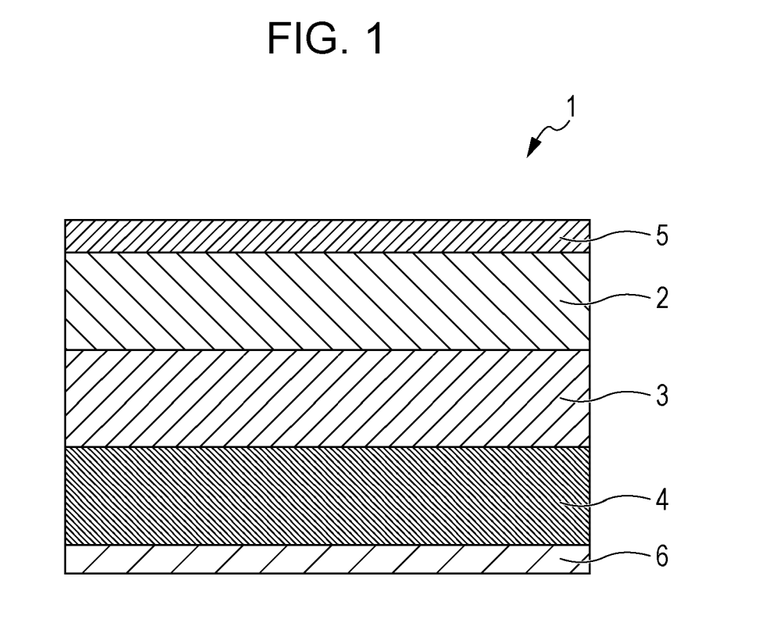
FIG. 1 is a cross-sectional view schematically illustrating a fluoride ion secondary battery of an embodiment of the present disclosure.

FIG. 1 is a cross-sectional view schematically illustrating the structure of a fluoride ion secondary battery of this embodiment. The fluoride ion secondary battery 1 shown in FIG. 1 includes a positive electrode layer 2, a negative electrode layer 4, and an electrolyte layer 3. The electrolyte layer 3 is disposed between the positive electrode layer 2 and the negative electrode layer 4. The positive electrode layer 2, the electrolyte layer 3, and the negative electrode layer 4 are in contact with each other.

The positive electrode layer 2, the electrolyte layer 3, and the negative electrode layer 4 are all solid. The battery 1 is an all-solid secondary battery.

The positive electrode layer 2 includes, for example, a positive electrode active material and a solid electrolyte having a fluoride ion conductivity. The electrolyte layer 3 includes a solid electrolyte having a fluoride ion conductivity. The negative electrode layer 4 includes, for example, a negative electrode active material and a solid electrolyte having a fluoride ion conductivity. In the battery 1, the fluoride ion conductive material of the first embodiment is contained in at least one layer selected from the positive electrode layer 2, the electrolyte layer 3, and the negative electrode layer 4.

The battery 1 can include the fluoride ion conductive material of the first embodiment as the electrolyte included in the electrolyte layer 3 and/or the negative electrode layer 4.

The battery 1 can include the fluoride ion conductive material of the first embodiment as the electrolyte included in the electrolyte layer 3. In such a case, the electrolyte layer 3 can consist of the fluoride ion conductive material of the first embodiment.

The battery 1 can include the fluoride ion conductive material of the first embodiment as the negative electrode active material included in the negative electrode layer 4 depending on the combination with the positive electrode active material included in the positive electrode layer 2.

The battery 1 can be operated at relatively low temperature of, for example, 200° C. or less, further 150° C. or less, by using the fluoride ion conductive material of the first embodiment. The use of the fluoride ion conductive material of the first embodiment to, in particular, the electrolyte layer 3 can construct a battery 1 having high output characteristics.

The electrolyte layer 3 is a layer having a fluoride ion conductivity in the thickness direction, i.e., the lamination direction of the positive electrode layer 2 and the negative electrode layer 4. Typically, the electrolyte layer 3 does not have electron conductivity in the thickness direction. The thickness of the electrolyte layer 3 is, for example, 1 to 1000 μm. The thickness of the electrolyte layer 3 can be 200 to 800 μm or 300 to 700 μm. If the electrolyte layer 3 has a thickness within these ranges, electrical short circuit between the positive electrode layer 2 and the negative electrode layer 4 can be prevented, and the conductivity of fluoride ions can be more certainly secured. If the conductivity of fluoride ions can be more certainly secured, a battery 1 having higher output characteristics can be constructed.

The specific structure of the electrolyte layer 3 is not limited. The electrolyte layer 3 is, for example, a thin film including a fluoride ion conductive material. The electrolyte layer 3 can be an aggregate of particles of a fluoride ion conductive material. These fluoride ion conductive materials can be the fluoride ion conductive material of the first embodiment.

As long as the battery 1 functions as a fluoride ion secondary battery, the electrolyte layer 3 may include a material other than the fluoride ion conductive material.

For example, the region indicated by the reference numeral "3" in FIG. 1 may be a liquid electrolyte. The liquid electrolyte may, for example, infiltrate a separator.

Examples of the material of the separator include a porous membrane, woven fabric, and nonwoven fabric.

The liquid electrolyte includes a solvent and a fluoride salt dissolved in the solvent and has a fluoride ion conductivity. The solvent may be, for example, a nonaqueous solvent.

Examples of the nonaqueous solvent include alcohols, cyclic ethers, chain ethers, cyclic carbonates, chain carbonates, cyclic carboxylates, and chain carboxylates.

Examples of the alcohol include ethanol, ethylene glycol, and propylene glycol.

Examples of the cyclic ether include 4-methyl-1,3-dioxolane, 2-methyltetrahydrofuran, and crown ether. Examples of the chain ether include 1,2-dimethoxyethane, ethylene glycol dimethyl ether, diethylene glycol dimethyl ether, triethylene glycol dimethyl ether, and tetraethylene glycol dimethyl ether. Examples of the cyclic carbonate include ethylene carbonate, propylene carbonate, butylene carbonate, fluoroethylene carbonate, and 4,5-difluoroethylene carbonate. Examples of the linear carbonate include dimethyl carbonate, ethyl methyl carbonate, and diethyl carbonate. Examples of the cyclic carboxylate include γ-butyrolactone. Examples of the chain carboxylate include ethyl acetate, propyl acetate, and butyl acetate.

For example, the nonaqueous solvent may be an ionic liquid.

Examples of the cation of the ionic liquid include 1-ethyl-3-methylimidazolium cation, 1-ethylpyridinium cation, 1-methoxyethyl-1-methylpyrrolidinium cation, N-methyl-N-propylpiperidinium cation, trimethylbutylammonium cation, N,N-diethyl-N-methylmethoxyethylammonium cation, tetrabutylphosphonium cation, triethyl-(2-methoxyethyl)phosphonium cation, triethylsulfonium cation, and diethyl-(2-methoxyethyl)sulfonium cation.

Examples of the anion of the ionic liquid include bis(fluorosulfonyl)amide anion, bis(trifluoromethanesulfonyl)amide anion, hexafluorophosphate anion, tri(pentafluoroethyl)trifluorophosphate anion, trifluoromethanesulfonate anion, and tetrafluoroborate anion.

The electrolyte may contain a single solvent only or may contain two or more solvents.

Examples of the fluoride salt include inorganic fluoride salts, organic fluoride salts, and fluoride ionic liquid.

Examples of the inorganic fluoride salt include lithium fluoride, sodium fluoride, potassium fluoride, rubidium fluoride, cesium fluoride, and ammonium fluoride.

Examples of the organic fluoride salt include tetramethylammonium fluoride, neopentyltrimethylammonium fluoride, trineopentylmethylammonium fluoride, tetraneopentylammonium fluoride, 1,3,3,6,6-hexamethylpiperidinium fluoride, 1-methyl-1-propylpiperidinium fluoride, tetramethylphosphonium fluoride, tetraphenylphosphonium fluoride, and trimethylsulfonium fluoride.

The electrolyte may contain a single fluoride salt only or may contain two or more fluoride salts.

The positive electrode layer 2 is a layer including a positive electrode active material. The positive electrode layer 2 may be a positive electrode mixture layer including a positive electrode active material and an electrolyte having a fluoride ion conductivity.

The positive electrode active material is a material that can occlude and release fluoride ions with charging and discharging of the battery. The occluding and releasing include both a form involving a chemical reaction with fluoride ions and a form not involving chemical reactions, such as intercalation. In the chemical reaction, a reaction forming a compound and a reaction forming a complex, not compound, such as an alloy or a solid solution, are included.

The positive electrode active material can be a material having a standard electrode potential higher than that of the negative electrode active material of the negative electrode layer 4 used in combination in the battery 1.

The positive electrode active material includes, for example, at least one selected from the group consisting of Co, Cu, Bi, Sn, Pb, Fe, Zn, Ga, and C. The positive electrode active material can be a simple substance of the at least one element, a complex, such as an alloy or a solid solution, including the at least one element, or a compound including the at least one element. The compound is, for example, a fluoride. Carbon is, for example, graphite or non-graphite carbon, such as hard carbon or coke. In the case of using carbon in the positive electrode active material, the manufacturing cost of the battery 1 can be reduced, and the average discharge voltage can be increased.

The thickness of the positive electrode layer 2 is, for example, 1 to 500 μm. The thickness of the positive electrode layer 2 can be 1 to 400 μm or 50 to 200 μm. If the positive electrode layer 2 has a thickness within these ranges, the energy density of the battery 1 can be further increased, and operation at a high output can be further stabilized.

The specific structure of the positive electrode layer 2 is not limited. The positive electrode layer 2 is, for example, a thin film including a positive electrode active material and a fluoride ion conductive material. The positive electrode layer 2 can include particles of a positive electrode active material and particles of a fluoride ion conductive material. The fluoride ion conductive material can be the fluoride ion conductive material of the first embodiment.

As long as the battery 1 functions as a fluoride ion secondary battery, the positive electrode layer 2 may include a material other than the above-mentioned materials.

The negative electrode layer is a layer including a negative electrode active material. The negative electrode layer 4 may be a negative electrode mixture layer including a negative electrode active material and an electrolyte having a fluoride ion conductivity.

The negative electrode active material is a material that can occlude and release fluoride ions with charging and discharging of the battery. The occluding and releasing include both a form involving a chemical reaction with fluoride ions and a form not involving chemical reactions, such as intercalation. In the chemical reaction, a reaction forming a compound and a reaction forming a complex, not compound, such as an alloy or a solid solution, are included.

The negative electrode active material can be a material having a standard electrode potential lower than that of the positive electrode active material of the positive electrode layer 2 used in combination in the battery 1.

The negative electrode active material includes, for example, at least one selected from the group consisting of Ti, Zr, Al, Sc, Rb, Ge, Cs, Mg, K, Na, La, Ca, Ba, and Sr. The negative electrode active material can be a simple substance of the at least one element, a complex, such as an alloy or a solid solution, including the at least one element, or a compound including the at least one element. The compound is, for example, a fluoride.

The thickness of the negative electrode layer 4 is, for example, 1 to 500 μm. The thickness of the negative electrode layer 4 can be 1 to 400 μm or 50 to 200 μm. If the negative electrode layer 4 has a thickness within these ranges, the energy density of the battery 1 can be further increased, and operation at a high output can be further stabilized.

The specific structure of the negative electrode layer 4 is not limited. The negative electrode layer 4 is, for example, a thin film including a negative electrode active material and a fluoride ion conductive material. The negative electrode layer 4 can include particles of a negative electrode active material and particles of a fluoride ion conductive material. The fluoride ion conductive material can be the fluoride ion conductive material of the first embodiment.

As long as the battery 1 functions as a fluoride ion secondary battery, the negative electrode layer 4 may include a material other than the above-mentioned materials.

The positive electrode layer 2 and the negative electrode layer 4 can include a conductive auxiliary agent. A layer including a conductive auxiliary agent can have a reduced electrode resistance.

The conductive auxiliary agent is not limited as long as it has electron conductivity. Examples of the conductive auxiliary agent include graphite, such as natural graphite and artificial graphite; carbon black, such as acetylene black and ketjen black; conductive fibers, such as carbon fibers and metal fibers; metal powders, such as carbon fluoride and aluminum; conductive whiskers, such as zinc oxide and potassium titanate; conductive metal oxides, such as titanium oxide; and conductive polymer compounds, such as polyaniline, polypyrrole, and polythiophene. The use of the carbon-based conductive auxiliary agent, such as graphite or carbon black, can reduce the cost of the battery 1.

The content ratios of the electrode active materials, the electrolytes, and the conductive auxiliary agents in the positive electrode layer 2 and the negative electrode layer 4 are not limited.

The positive electrode layer 2 and the negative electrode layer 4 can each include at least one selected from the electrode active material, the electrolyte, and the conductive auxiliary agent in a particle form.

The layer including particles can further include a binder for binding the particles to each other. The binder can improve the binding properties between the particles in the layer. In addition, the binder can improve the bondability (or adhesion strength) to an adjacent layer. For example, the binder can improve the bondability of the positive electrode layer 2 or the negative electrode layer 4 to a current collector layer 5 or 6 adjacent to the layer. The improvement in the bondability contributes to a reduction in the thickness of each layer. For example, in the positive electrode layer 2 and the negative electrode layer 4, the particles of the electrode active material can be more reliably brought into contact with each other. In the electrolyte layer 3, the particles of the electrolyte can be more reliably brought into contact with each other. The reduction in the thickness of each layer can further increase the energy density of the battery 1.

The type of the binder is not limited. Examples of the binder include binders composed of fluorine-based resins, such as polyvinylidene fluoride (PVdF), polytetrafluoroethylene (PTFE), a tetrafluoroethylene-hexafluoropropylene (FEP) copolymer, a tetrafluoroethylene-hexafluoroethylene copolymer, a Teflon binder ("Teflon" is a registered trademark), poly(vinylidene fluoride), a tetrafluoroethylene-perfluoroalkyl vinyl ether (PFA) copolymer, a vinylidene fluoride-hexafluoropropylene copolymer, a vinylidene fluoride-chlorotrifluoroethylene copolymer, an ethylene-tetrafluoroethylene (ETFE) copolymer, polychlorotrifluoroethylene (PCTFE), a vinylidene fluoride-hexafluoropropylene-tetrafluoroethylene copolymer, a vinylidene fluoride-perfluoromethyl vinyl ether-tetrafluoroethylene copolymer, and an ethylene-chlorotrifluoroethylene (ECTFE) copolymer; polymer compounds, such as carboxymethyl cellulose, polyacrylonitrile, polyethylene oxide, polypropylene oxide, polyvinyl chloride, polymethyl methacrylate, polymethyl acrylate, polymethacrylic acid and metal salts thereof, polyacrylic acid and metal salts thereof, polyvinyl alcohol, polyvinylidene chloride, polyethylene imine, polymethacrylonitrile, polyvinyl acetate, polyimide, polyamic acid, polyamide imide, polyethylene, polypropylene, an ethylene-propylene-diethane terpolymer, polyvinyl acetate, nitrocellulose, an ethylene-acrylic acid copolymer and an $Na^+$ ion crosslinked structure thereof, an ethylene-methacrylic acid copolymer and an $Na^+$ ion crosslinked structure thereof, an ethylene-methyl acrylate copolymer and an $Na^+$ ion crosslinked structure thereof, an ethylene-methyl methacrylate copolymer and an $Na^+$ ion crosslinked structure thereof, a polyester resin, a monoalkyltrialkoxysilane polymer, and a polymer prepared by copolymerization of a monoalkyltrialkoxysilane polymer and a tetraalkoxysilane monomer; and rubbery polymers, such as styrene butadiene rubber (SBR), butadiene rubber (BR), a styrene-isoprene copolymer, an isobutylene-isoprene copolymer (butyl rubber), acrylonitrile-butadiene rubber, an ethylene-propylene-diene copolymer, an acrylonitrile-butadiene copolymer (NBR), hydrogenated SBR, hydrogenated NBR, ethylene-propylene-dienemer (EPDM), and sulfonated EPDM.

When the binder is an insulation material that does not conduct fluoride ions and/or electrons, an excessive increase in the content of the binder in each layer may deteriorate the charge and discharge characteristics of the battery or may rather decrease the energy density. From this viewpoint, the content of the binder, which is an insulation material, in the layer is, for example, 20 wt % or less and can be 5 wt % or less.

In the battery 1, all the positive electrode layer 2, the electrolyte layer 3, and the negative electrode layer 4 may include a binder. Alternatively, at least one layer selected from the positive electrode layer 2, the electrolyte layer 3, and the negative electrode layer 4 can have a structure not including a binder.

The battery 1 exemplified in FIG. 1 further includes a positive electrode current collector 5 and a negative electrode current collector 6. The positive electrode current collector 5 is in contact with the positive electrode layer 2. The negative electrode current collector 6 is in contact with the negative electrode layer 4. The layered product of the positive electrode layer 2, the electrolyte layer 3, and the negative electrode layer 4 is disposed between the positive electrode current collector 5 and the negative electrode current collector 6.

The positive electrode current collector 5 and the negative electrode current collector 6 each have an electron conductivity. The positive electrode current collector 5 and the negative electrode current collector 6 each can be made of a material having an electron conductivity and being resistant to corrosion in a charge and discharge environment of the battery 1.

The positive electrode current collector 5 is made of, for example, a metal material, such as aluminum, gold, platinum, or an alloy thereof. The positive electrode current collector 5 may have any shape, such as a sheet or a film. The positive electrode current collector 5 can be a porous or nonporous sheet or film. Examples of the sheet or film include foil and mesh. Aluminum and alloys thereof are inexpensive and can be easily formed into a thin film. The positive electrode current collector 5 can be made of carbon-coated aluminum. The thickness of the positive electrode current collector 5 is, for example, 1 to 30 μm. If the positive electrode current collector 5 has a thickness within this range, the strength of the current collector can be more certainly secured. For example, the current collector is prevented from being cracked or broken, and the energy density of the battery 1 can be more certainly secured.

The positive electrode current collector 5 can have a positive electrode terminal.

The negative electrode current collector 6 is made of, for example, a metal material, such as gold, platinum, aluminum, or an alloy thereof. The negative electrode current collector 6 may have any shape, such as a sheet or a film. The negative electrode current collector 6 can be a porous or nonporous sheet or film. Examples of the sheet or film include foil and mesh. Aluminum and alloys thereof are inexpensive and can be easily formed into a thin film. The negative electrode current collector 6 can be made of carbon-coated aluminum. The thickness of the negative electrode current collector 6 is, for example, 1 to 30 μm. If the negative electrode current collector 6 has a thickness within this range, the strength of the current collector can be more certainly secured. For example, the current collector is prevented from being cracked or broken, and the energy density of the battery 1 can be more certainly secured.

The negative electrode current collector 6 can have a negative electrode terminal.

The fluoride ion secondary battery of the embodiment may include any member and have any structure other than those described above as long as the battery can be charged and discharged and can be used as a secondary battery.

The fluoride ion secondary battery of the embodiment may have any shape. The shape can be a shape of a known secondary battery. Examples of the shape include rectangular, circular, elliptical, and hexagonal shapes. The fluoride ion secondary battery of the embodiment may have a structure in which the battery (or single battery) exemplified in FIG. 1 is further stacked or is folded. In such cases, the fluoride ion secondary battery of the embodiment can have various battery shapes, such as cylindrical, square, button, coin, and flat shape.

The fluoride ion secondary battery of the embodiment may be produced by any method. The fluoride ion secondary battery of the embodiment can be produced by using a method of producing a known secondary battery, typically, an all-solid secondary battery, except that the fluoride ion conductive material of the first embodiment is used as an electrolyte.

Each layer constituting the fluoride ion secondary battery of the embodiment can be formed by using a known thin film-forming method. The thin film-forming method is, for example, chemical deposition or physical deposition. Examples of the physical deposition include sputtering, vacuum deposition, ion plating, and pulsed laser deposition (PLD) by irradiating a target with a pulsed laser. Examples of the chemical deposition include chemical vapor deposition (CVD) methods, such as plasma CVD, thermal CVD, and laser CVD; liquid phase film-forming methods represented by a wet plating method, such as electrolytic plating, immersion plating, or electroless plating; a sol-gel method; a metal-organic decomposition (MOD) method; a spray pyrolysis method; a doctor blade method using a fine particle dispersion; spin coating; and printing technologies, such as ink jetting and screen printing. The thin film-forming method is not limited to these examples.

3. Examples

The fluoride ion conductive material of the present disclosure will now be more specifically described based on Examples. The fluoride ion conductive material of the present disclosure is not limited to the materials shown in the following Examples.

(Sample 1)

KF particles (manufactured by Kojundo Chemical Laboratory Co., Ltd.) were milled with a planetary ball mill for 6 hours. Subsequently, the crystallization temperature of the particles after the milling treatment was measured with differential scanning calorimeter (DSC). Subsequently, the particles after the milling treatment were heated in an inert gas atmosphere at a temperature 20° C. higher than the measured crystallization temperature for 1 hour. As a result, a material having a composition represented by the formula KF was produced.

(Sample 2)

Particles of KF and $CaF_2$ (both manufactured by Kojundo Chemical Laboratory Co., Ltd.) were mixed at a molar ratio $KF:CaF_2$ of 90:10. Subsequently, the mixture was milled with a planetary ball mill for 6 hours. Subsequently, the crystallization temperature of the mixture after the milling treatment was measured with a DSC. Subsequently, the mixture after the milling treatment was heated in an inert gas atmosphere at a temperature 20° C. higher than the measured crystallization temperature for 1 hour. As a result, a fluoride ion conductive material having a composition represented by the formula $K_{0.9}Ca_{0.1}F_{1.1}$ was prepared.

(Sample 3)

A fluoride ion conductive material having a composition represented by the formula $K_{0.8}Ca_{0.2}F_{1.2}$ was prepared as in Sample 2 except that the mixing ratio of KF and $CaF_2$ particles was $KF:CaF_2$=80:20 as the molar ratio.

(Sample 4)

A fluoride ion conductive material having a composition represented by the formula $K_{0.7}Ca_{0.3}F_{1.3}$ was prepared as in Sample 2 except that the mixing ratio of KF and $CaF_2$ particles was $KF:CaF_2$=70:30 as the molar ratio.

(Sample 5)

A fluoride ion conductive material having a composition represented by the formula $K_{0.6}Ca_{0.4}F_{1.4}$ was prepared as in Sample 2 except that the mixing ratio of KF and $CaF_2$ particles was $KF:CaF_2$=60:40 as the molar ratio.

(Sample 6)

A fluoride ion conductive material having a composition represented by the formula $K_{0.5}Ca_{0.5}F_{1.5}$ was prepared as in Sample 2 except that the mixing ratio of KF and $CaF_2$ particles was $KF:CaF_2=50:50$ as the molar ratio.

(Sample 7)

A fluoride ion conductive material having a composition represented by the formula $K_{0.4}Ca_{0.6}F_{1.6}$ was prepared as in Sample 2 except that the mixing ratio of KF and $CaF_2$ particles was $KF:CaF_2=40:60$ as the molar ratio.

(Sample 8)

A fluoride ion conductive material having a composition represented by the formula $K_{0.3}Ca_{0.7}F_{1.7}$ was prepared as in Sample 2 except that the mixing ratio of KF and $CaF_2$ particles was $KF:CaF_2=30:70$ as the molar ratio.

(Sample 9)

A fluoride ion conductive material having a composition represented by the formula $K_{0.2}Ca_{0.8}F_{1.8}$ was prepared as in Sample 2 except that the mixing ratio of KF and $CaF_2$ particles was $KF:CaF_2=20:80$ as the molar ratio.

(Sample 10)

A fluoride ion conductive material having a composition represented by the formula $K_{0.1}Ca_{0.9}F_{1.9}$ was prepared as in Sample 2 except that the mixing ratio of KF and $CaF_2$ particles was $KF:CaF_2=10:90$ as the molar ratio.

(Sample 11)

A material having a composition represented by the formula $CaF_2$ was produced as in Sample 1 except that $CaF_2$ particles were used instead of the KF particles.

(Sample 12)

Particles of KF and $SrF_2$ (both manufactured by Kojundo Chemical Laboratory Co., Ltd.) were mixed at a molar ratio $KF:SrF_2$ of 90:10. Subsequently, the mixture was milled with a planetary ball mill for 6 hours. Subsequently, the crystallization temperature of the mixture after the milling treatment was measured with a DSC. Subsequently, the mixture after the milling treatment was heated in an inert gas atmosphere at a temperature 20° C. higher than the measured crystallization temperature for 1 hour. As a result, a fluoride ion conductive material having a composition represented by the formula $K_{0.9}Sr_{0.1}F_{1.1}$ was prepared.

(Sample 13)

A fluoride ion conductive material having a composition represented by the formula $K_{0.8}Sr_{0.2}F_{1.2}$ was prepared as in Sample 12 except that the mixing ratio of KF and $SrF_2$ particles was $KF:SrF_2=80:20$ as the molar ratio.

(Sample 14)

A fluoride ion conductive material having a composition represented by the formula $K_{0.1}Sr_{0.3}F_{1.3}$ was prepared as in Sample 12 except that the mixing ratio of KF and $SrF_2$ particles was $KF:SrF_2=70:30$ as the molar ratio.

(Sample 15)

A fluoride ion conductive material having a composition represented by the formula $K_{0.6}Sr_{0.4}F_{1.4}$ was prepared as in Sample 12 except that the mixing ratio of KF and $SrF_2$ particles was $KF:SrF_2=60:40$ as the molar ratio.

(Sample 16)

A fluoride ion conductive material having a composition represented by the formula $K_{0.5}Sr_{0.5}F_{1.5}$ was prepared as in Sample 12 except that the mixing ratio of KF and $SrF_2$ particles was $KF:SrF_2=50:50$ as the molar ratio.

(Sample 17)

A fluoride ion conductive material having a composition represented by the formula $K_{0.4}Sr_{0.6}F_{1.6}$ was prepared as in Sample 12 except that the mixing ratio of KF and $SrF_2$ particles was $KF:SrF_2=40:60$ as the molar ratio.

(Sample 18)

A fluoride ion conductive material having a composition represented by the formula $K_{0.3}Sr_{0.7}F_{1.7}$ was prepared as in Sample 12 except that the mixing ratio of KF and $SrF_2$ particles was $KF:SrF_2=30:70$ as the molar ratio.

(Sample 19)

A fluoride ion conductive material having a composition represented by the formula $K_{0.2}Sr_{0.8}F_{1.8}$ was prepared as in Sample 12 except that the mixing ratio of KF and $SrF_2$ particles was $KF:SrF_2=20:80$ as the molar ratio.

(Sample 20)

A material having a composition represented by the formula $SrF_2$ was produced as in Sample 1 except that $SrF_2$ particles were used instead of the KF particles.

(Sample 21)

Particles of KF and $BaF_2$ (both manufactured by Kojundo Chemical Laboratory Co., Ltd.) were mixed at a molar ratio $KF:BaF_2$ of 90:10. Subsequently, the mixture was milled with a planetary ball mill for 6 hours. Subsequently, the crystallization temperature of the mixture after the milling treatment was measured with a DSC. Subsequently, the mixture after the milling treatment was heated in an inert gas atmosphere at a temperature 20° C. higher than the measured crystallization temperature for 1 hour. As a result, a fluoride ion conductive material having a composition represented by the formula $K_{0.9}Ba_{0.1}F_{1.1}$ was prepared.

(Sample 22)

A fluoride ion conductive material having a composition represented by the formula $K_{0.8}Ba_{0.2}F_{1.2}$ was prepared as in Sample 21 except that the mixing ratio of KF and $BaF_2$ particles was $KF:BaF_2=80:20$ as the molar ratio.

(Sample 23)

A fluoride ion conductive material having a composition represented by the formula $K_{0.7}Ba_{0.3}F_{1.3}$ was prepared as in Sample 21 except that the mixing ratio of KF and $BaF_2$ particles was $KF:BaF_2=70:30$ as the molar ratio.

(Sample 24)

A fluoride ion conductive material having a composition represented by the formula $K_{0.6}Ba_{0.4}F_{1.4}$ was prepared as in Sample 21 except that the mixing ratio of KF and $BaF_2$ particles was $KF:BaF_2=60:40$ as the molar ratio.

(Sample 25)

A fluoride ion conductive material having a composition represented by the formula $K_{0.5}Ba_{0.5}F_{1.5}$ was prepared as in Sample 21 except that the mixing ratio of KF and $BaF_2$ particles was $KF:BaF_2=50:50$ as the molar ratio.

(Sample 26)

A fluoride ion conductive material having a composition represented by the formula $K_{0.4}Ba_{0.6}F_{1.6}$ was prepared as in Sample 21 except that the mixing ratio of KF and $BaF_2$ particles was $KF:BaF_2=40:60$ as the molar ratio.

(Sample 27)

A fluoride ion conductive material having a composition represented by the formula $K_{0.3}Ba_{0.7}F_{1.7}$ was prepared as in Sample 21 except that the mixing ratio of KF and $BaF_2$ particles was $KF:BaF_2=30:70$ as the molar ratio.

(Sample 28)

A fluoride ion conductive material having a composition represented by the formula $K_{0.2}Ba_{0.8}F_{1.8}$ was prepared as in Sample 21 except that the mixing ratio of KF and $BaF_2$ particles was $KF:BaF_2=20:80$ as the molar ratio.

(Sample 29)

A fluoride ion conductive material having a composition represented by the formula $K_{0.1}Ba_{0.9}F_{1.9}$ was prepared as in Sample 21 except that the mixing ratio of KF and $BaF_2$ particles was $KF:BaF_2=10:90$ as the molar ratio.

(Sample 30)

A material having a composition represented by the formula $BaF_2$ was produced as in Sample 1 except that $BaF_2$ particles were used instead of KF particles.

(Evaluation of Fluoride Ion Conductivity)

The fluoride ion conductivity of each sample of the fluoride ion conductive materials was evaluated as follows.

Figure 2:
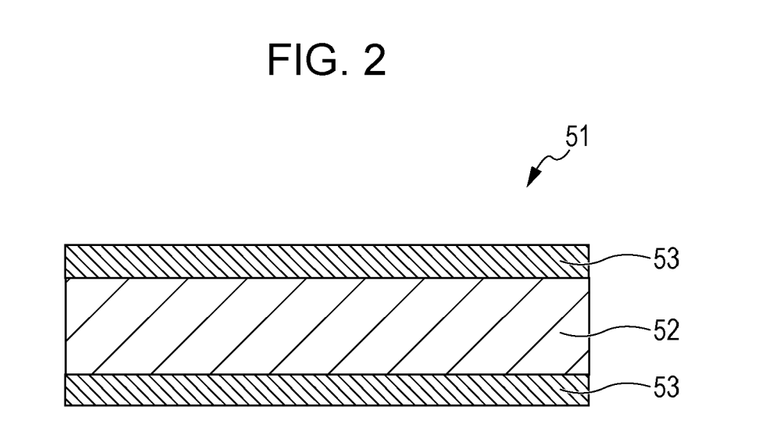
FIG. 2 is a cross-sectional view schematically illustrating a cell for evaluating the ion conductivity of a fluoride ion conductive material produced in an example.

From each of the produced particulate ion conductive materials, 0.20 g was weighed. The weighed material was placed in a metal tube having a diameter of 10 mm and was pre-pressed at a pressure of 10 MPa at 25° C. for 1 minute to form an electrolyte layer 52 (see FIG. 2) in a disk shape (diameter: 10 mm). Subsequently, a gold foil 53 having a diameter of 10 mm and a thickness of 20 μm was disposed on each main surface of the formed electrolyte layer 52. Subsequently, the electrolyte layer 52 provided with the gold foils 53 was pressed at a pressure of 40 MPa at 25° C. for 1 minute to produce a cell 51 for evaluation of ion conductivity. Subsequently, an impedance analyzer was connected to both the gold foils 53 of the produced cell 51, and the ion conductivity of the cell 51 being maintained at 140° C. was measured. The ion conductivity was measured by a complex impedance method.

Tables 1 to 3 show the fluoride ion conductivity of each sample. The "Average composition" in Tables 1 to 3 shows the composition estimated from the raw material blend ratio.

TABLE 1

|  | Average composition | Conductivity [S/cm] |
| --- | --- | --- |
| Sample 1 | KF | $8.4 \times 10^{-7}$ |
| Sample 2 | $K_{0.9}Ca_{0.1}F_{1.1}$ | $5.9 \times 10^{-9}$ |
| Sample 3 | $K_{0.8}Ca_{0.2}F_{1.2}$ | $7.0 \times 10^{-5}$ |
| Sample 4 | $K_{0.7}Ca_{0.3}F_{1.3}$ | $2.0 \times 10^{-4}$ |
| Sample 5 | $K_{0.6}Ca_{0.4}F_{1.4}$ | $4.7 \times 10^{-10}$ |
| Sample 6 | $K_{0.5}Ca_{0.5}F_{1.5}$ | $2.3 \times 10^{-9}$ |
| Sample 7 | $K_{0.4}Ca_{0.6}F_{1.6}$ | $5.4 \times 10^{-9}$ |
| Sample 8 | $K_{0.3}Ca_{0.7}F_{1.7}$ | $9.6 \times 10^{-9}$ |
| Sample 9 | $K_{0.2}Ca_{0.8}F_{1.8}$ | $1.2 \times 10^{-9}$ |
| Sample 10 | $K_{0.1}Ca_{0.9}F_{1.9}$ | $1.7 \times 10^{-8}$ |
| Sample 11 | $CaF_2$ | $3.9 \times 10^{-10}$ |

TABLE 2

|  | Average composition | Conductivity [S/cm] |
| --- | --- | --- |
| Sample 1 | KF | $8.4 \times 10^{-7}$ |
| Sample 12 | $K_{0.9}Sr_{0.1}F_{1.1}$ | $2.2 \times 10^{-6}$ |
| Sample 13 | $K_{0.8}Sr_{0.2}F_{1.2}$ | $2.0 \times 10^{-5}$ |
| Sample 14 | $K_{0.7}Sr_{0.3}F_{1.3}$ | $2.5 \times 10^{-5}$ |
| Sample 15 | $K_{0.6}Sr_{0.4}F_{1.4}$ | $4.8 \times 10^{-6}$ |
| Sample 16 | $K_{0.5}Sr_{0.5}F_{1.5}$ | $1.2 \times 10^{-4}$ |
| Sample 17 | $K_{0.4}Sr_{0.6}F_{1.6}$ | $1.4 \times 10^{-2}$ |
| Sample 18 | $K_{0.3}Sr_{0.7}F_{1.7}$ | $7.0 \times 10^{-8}$ |
| Sample 19 | $K_{0.2}Sr_{0.8}F_{1.8}$ | $1.3 \times 10^{-9}$ |
| Sample 20 | $SrF_2$ | $3.8 \times 10^{-10}$ |

TABLE 3

|  | Average composition | Conductivity [S/cm] |
| --- | --- | --- |
| Sample 1 | KF | $8.4 \times 10^{-7}$ |
| Sample 21 | $K_{0.9}Ba_{0.1}F_{1.1}$ | $1.2 \times 10^{-6}$ |
| Sample 22 | $K_{0.8}Ba_{0.2}F_{1.2}$ | $1.7 \times 10^{-5}$ |
| Sample 23 | $K_{0.7}Ba_{0.3}F_{1.3}$ | $2.8 \times 10^{-5}$ |
| Sample 24 | $K_{0.6}Ba_{0.4}F_{1.4}$ | $8.3 \times 10^{-6}$ |
| Sample 25 | $K_{0.5}Ba_{0.5}F_{1.5}$ | $2.7 \times 10^{-3}$ |
| Sample 26 | $K_{0.4}Ba_{0.6}F_{1.6}$ | $4.4 \times 10^{-5}$ |
| Sample 27 | $K_{0.3}Ba_{0.7}F_{1.7}$ | $8.0 \times 10^{-6}$ |
| Sample 28 | $K_{0.2}Ba_{0.8}F_{1.8}$ | $4.2 \times 10^{-5}$ |
| Sample 29 | $K_{0.1}Ba_{0.9}F_{1.9}$ | $9.0 \times 10^{-9}$ |
| Sample 30 | $BaF_2$ | $4.6 \times 10^{-8}$ |

As shown in Table 1, among Samples 2 to 10 of complex fluorides containing potassium and calcium, the conductivities of Samples 3 and 4 were higher than that of Sample 1 of KF and that of Sample 11 of $CaF_2$. This result suggests that Samples 3 and 4 each have a phase of a compound represented by a composition different from those of KF and $CaF_2$.

As shown in Table 2, among Samples 12 to 19 of complex fluorides containing potassium and strontium, the conductivities of Samples 12 to 17 were higher than that of Sample 1 of KF and that of Sample 20 of $SrF_2$. This result suggests that Samples 12 to 17 each have a phase of a compound represented by a composition different from those of KF and $SrF_2$.

As shown in Table 3, among Samples 21 to 29 of complex fluorides containing potassium and barium, the conductivities of Samples 21 to 28 were higher than that of Sample 1 of KF and that of Sample 30 of $BaF_2$. This result suggests that Samples 21 to 28 each have a phase of a compound represented by a composition different from those of KF and $BaF_2$.

(XRD Analysis of Fluoride Ion Conductive Material)

The phase compositions of Samples 3 and 4 were analyzed by an XRD method. The XRD spectra of Samples 3 and 4 had peaks not only at the peak positions appearing in the diffraction pattern of a standard sample of KF and in the diffraction pattern of a standard sample of $CaF_2$ but also at the peak positions appearing in the diffraction pattern of a standard sample of $KCaF_3$. This result demonstrates that Samples 3 and 4 include a phase different from that of a mixture of KF and $CaF_2$, more specifically, a phase of $KCaF_3$ or a K—Ca complex fluoride having a crystal structure similar to that of $KCaF_3$.

The fluoride ion secondary battery of the present disclosure is not limited to specific embodiment described above and can be variously modified or changed within the scope of the invention defined by the claims. For example, the technical features shown in Embodiments described in DETAILED DESCRIPTION can be appropriately replaced or combined for solving a part or all of the above-described problems or for achieving a part or all of the above-described effects. Furthermore, the technical features can be appropriately deleted unless they are explained in the present specification as essential technical features.

What is claimed is:

1. A fluoride ion conductor comprising:
    a compound containing potassium, at least one alkaline earth metal, and fluorine, wherein:
    the at least one alkaline earth metal is selected from the group consisting of calcium, barium, and strontium,
    the at least one alkaline earth metal includes calcium, and
    in an average composition of the fluoride ion conductor, a ratio of a mole number of the at least one alkaline earth metal to a total mole number of the potassium and the at least one alkaline earth metal is 0.2 or more and 0.3 or less.

2. The fluoride ion conductor according to claim 1, further comprising:
    a mixture containing potassium, the at least one alkaline earth metal, and fluorine.

3. The fluoride ion conductor according to claim 1, wherein
    the compound consists of: potassium, the at least one alkaline earth metal, and fluorine.

4. The fluoride ion conductor according to claim 3, wherein
    the at least one alkaline earth metal consists of calcium; and in an average composition of the fluoride ion conductor, a ratio of a mole number of the calcium to a total mole number of the potassium and the calcium is 0.2 or more and 0.3 or less.

5. A fluoride ion secondary battery comprising:
a positive electrode;
a negative electrode; and
an electrolyte disposed between the positive electrode and the negative electrode and having a fluoride ion conductivity, wherein
at least one of the positive electrode, the negative electrode, and the electrolyte includes the fluoride ion conductor according to claim 1.

6. The fluoride ion secondary battery according to claim 5, wherein
the negative electrode includes the fluoride ion conductor.

7. The fluoride ion secondary battery according to claim 6, wherein
the negative electrode includes a negative electrode active material and a coat coating the negative electrode active material; and
the coat contains the fluoride ion conductor.

8. The fluoride ion secondary battery according to claim 5, wherein
the positive electrode includes the fluoride ion conductor.

9. The fluoride ion secondary battery according to claim 8, wherein
the positive electrode includes a positive electrode active material and a coat coating the positive electrode active material; and
the coat contains the fluoride ion conductor.

10. The fluoride ion secondary battery according to claim 5, wherein
the electrolyte is a liquid electrolyte.

11. The fluoride ion secondary battery according to claim 5, wherein
the electrolyte includes the fluoride ion conductor.

12. The fluoride ion secondary battery according to claim 5, wherein
the positive electrode includes a positive electrode active material containing at least one selected from the group consisting of Co, Cu, Bi, Sn, Pb, Fe, Zn, Ga, and C.

13. The fluoride ion secondary battery according to claim 5, wherein
the negative electrode contains includes a negative electrode active material containing at least one selected from the group consisting of Ti, Zr, Al, Sc, Rb, Ge, Cs, Mg, K, Na, La, Ca, Ba, and Sr.

* * * * *